US011711274B2

(12) United States Patent
Yang et al.

(10) Patent No.: US 11,711,274 B2
(45) Date of Patent: Jul. 25, 2023

(54) REQUEST RESPONSE BASED ON A PERFORMANCE VALUE OF A SERVER

(71) Applicant: International Business Machines Corporation, Armonk, NY (US)

(72) Inventors: Bo Yang, Beijing (CN); Anca Sailer, Scarsdale, NY (US); HongLei Guo, Beijing (CN); Zhili Guo, Beijing (CN); Zhong Su, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/787,068

(22) Filed: Feb. 11, 2020

(65) Prior Publication Data
US 2021/0250252 A1 Aug. 12, 2021

(51) Int. Cl.
*G06F 15/16* (2006.01)
*G06F 15/173* (2006.01)
*H04L 41/5025* (2022.01)
*H04L 67/61* (2022.01)
*H04L 67/63* (2022.01)

(52) U.S. Cl.
CPC ......... *H04L 41/5025* (2013.01); *H04L 67/61* (2022.05); *H04L 67/63* (2022.05)

(58) Field of Classification Search
CPC . H04L 41/5025; H04L 67/322; H04L 67/327; H04L 41/50; H04L 67/63; H04L 67/61; H04L 67/1008; H04L 67/1012
USPC ................. 709/202–203, 223–224
See application file for complete search history.

(56) References Cited

U.S. PATENT DOCUMENTS

| 5,459,837 | A  | * | 10/1995 | Caccavale | H04L 67/1002 |
| | | | | | 709/224 |
| 6,182,125 | B1 | * | 1/2001 | Borella | G06F 16/9577 |
| | | | | | 709/218 |
| 6,601,098 | B1 | * | 7/2003 | Case | H04L 69/329 |
| | | | | | 709/224 |
| 8,176,172 | B2 | * | 5/2012 | Douglis | H04L 41/5003 |
| | | | | | 709/224 |
| 8,200,837 | B1 | * | 6/2012 | Bhatti | H04L 67/1008 |
| | | | | | 709/219 |
| 8,949,213 | B2 | | 2/2015 | Jackson | |
| 9,438,500 | B2 | * | 9/2016 | Colon | H04L 41/142 |
| 9,692,708 | B2 | | 6/2017 | Dumitriu | |
| 9,804,943 | B2 | | 10/2017 | Kraft | |
| 10,257,288 | B2 | | 4/2019 | Xiao | |

(Continued)

OTHER PUBLICATIONS

Boloor et al., "Dynamic Request Allocation and Scheduling for Context Aware Applications Subject To a Percentile Response Time SLA in a Distributed Cloud", ResearchGate, Conference Paper—Nov. 2010, DOI: 10.1109/CloudCom.2010.96—Source: DBLP, 20 pages.

(Continued)

*Primary Examiner* — Bharat Barot
(74) *Attorney, Agent, or Firm* — Brian M. Restauro

(57) ABSTRACT

The present invention relates to a method, computer system, and computer program product for data processing based on a response strategy. According to the method, a performance value of a server is determined in response to receiving at least one request to the server. A response strategy for the at least one request is determined based on the determined performance value. At least one response is provided to the at least one request according to the determined response strategy.

19 Claims, 8 Drawing Sheets

(56) References Cited

U.S. PATENT DOCUMENTS

| | | | | |
|---|---|---|---|---|
| 2004/0215713 A1* | 10/2004 | Bish | .................... | H04L 67/1008 709/203 |
| 2010/0306249 A1* | 12/2010 | Hill | .................... | G06F 16/9535 707/769 |
| 2013/0124683 A1* | 5/2013 | Watanabe | .......... | H04N 21/4622 709/217 |
| 2014/0059179 A1* | 2/2014 | Lam | .................... | H04L 67/1002 709/219 |
| 2015/0120914 A1* | 4/2015 | Wada | ................. | H04L 41/5009 709/224 |
| 2015/0134831 A1* | 5/2015 | Hiroishi | .............. | H04L 67/1008 709/226 |
| 2015/0271035 A1* | 9/2015 | Colon | .................. | H04L 41/142 709/224 |
| 2016/0036540 A1* | 2/2016 | Fang | .................... | H04W 24/08 370/252 |
| 2017/0308317 A1* | 10/2017 | Kodama | ................ | G06F 11/34 |
| 2018/0018339 A1 | 1/2018 | Basak | | |
| 2019/0057418 A1* | 2/2019 | Musumeci | ......... | G06Q 30/0264 |
| 2019/0109926 A1* | 4/2019 | Hotchkies | ............... | H04L 67/63 |
| 2019/0149482 A1* | 5/2019 | Kumar | ................ | H04L 67/1004 709/226 |
| 2020/0287794 A1* | 9/2020 | Rastogi | ............... | H04L 41/5025 |

OTHER PUBLICATIONS

Kapgate, Deepak, "Efficient Service Broker Algorithm for Data Center Selection in Cloud Computing", IJCSMC, vol. 3, Issue. 1, Jan. 2014, 11 pages.

Mell et al., "The NIST Definition of Cloud Computing", Recommendations of the National Institute of Standards and Technology, NIST Special Publication 800-145, Sep. 2011, 7 pages.

\* cited by examiner

REQUEST RESPONSE BASED ON A PERFORMANCE VALUE OF A SERVER

BACKGROUND

The present invention relates to computer techniques, and more specifically, to data processing.

A service/application (referred to hereinafter as a service) is a program or process that typically runs on one or more hosts/servers (referred to hereinafter as a server) in a computing environment to perform a task or provide a corresponding function. Requests for accessing the service may be processed by the server in the computing environment to fulfill workloads of the task/function. In a complex data processing system, there might be millions of requests for accessing a service and sometimes, the number of requests may be unstable due to expected or unexpected events.

SUMMARY OF THE INVENTION

According to an aspect of the present invention, there is a method, computer program product, and computer system that performs the following operations (not necessarily in the following order): determining a performance value of a server in response to the server receiving at least one request, determining a response strategy for the at least one request based on the determined performance value, and providing at least one response to the at least one request according to the determined response strategy.

It is to be understood that the above Summary is not intended to identify key or essential features of embodiments of the present disclosure, nor is it intended to be used to limit the scope of the present disclosure. Other features of the present disclosure will become easily comprehensible through the description below.

DETAILED DESCRIPTION

Figure 1:
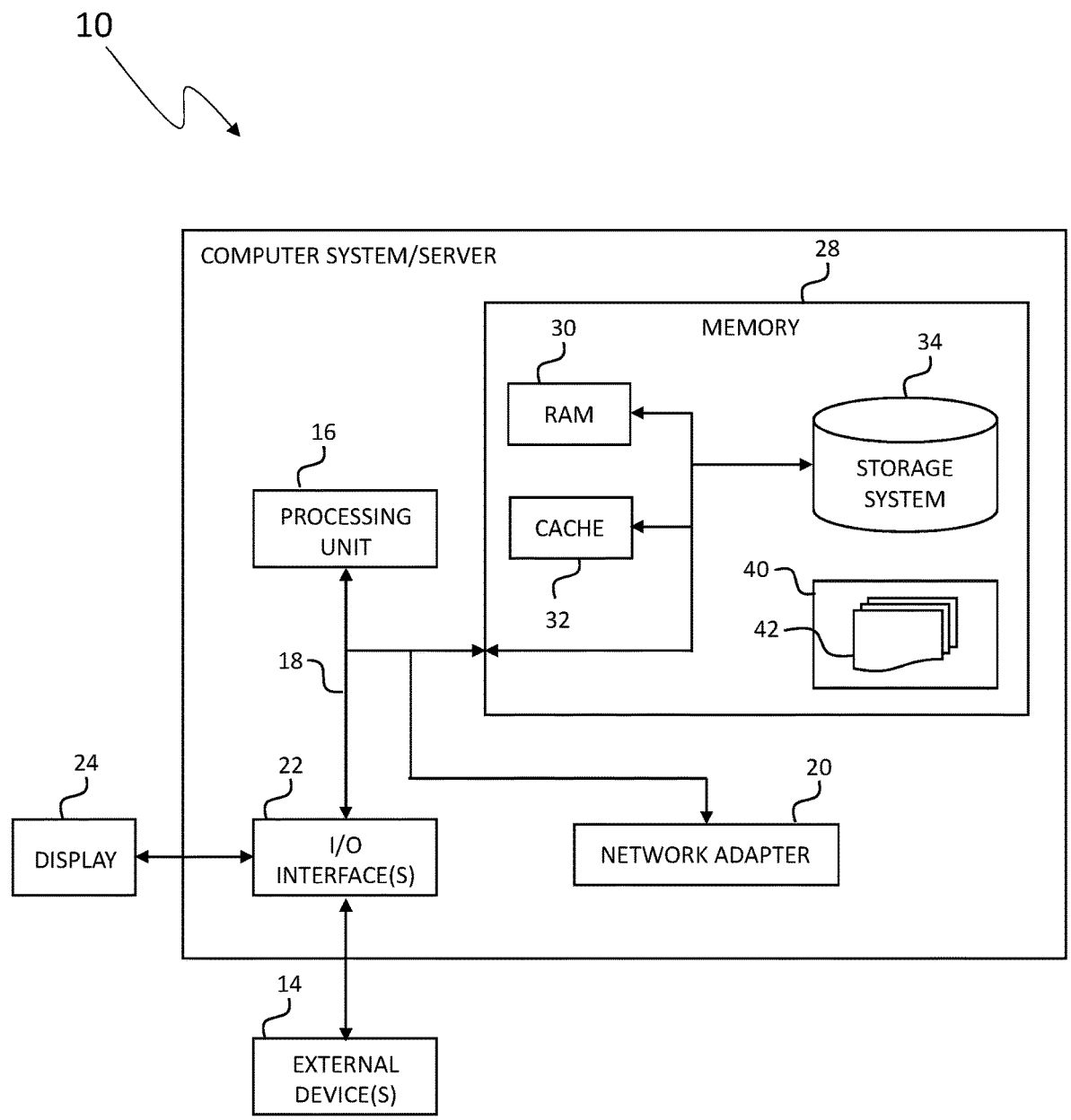
FIG. 1 depicts a cloud computing node, according to an embodiment of the present invention.

Embodiments of the present invention will be described in more detail with reference to the accompanying drawings, in which the embodiments of the present disclosure have been illustrated. However, the present disclosure can be implemented in various manners, and thus, should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth herein.

In cloud computing node 10, there is a computer system/server 12 (or a portable electronic device such as a communication device), which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general-purpose computing device. The components of computer system/server 12 may include, but are not limited to, one or more processors or processing unit(s) 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a compact disc-read only memory (CD-ROM), digital versatile disc-read only memory (DVD-ROM), or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (e.g., at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Further, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, Redundant Array of Independent Disks (RAID) systems, tape drives, and data archival storage systems, etc.

Figure 2:
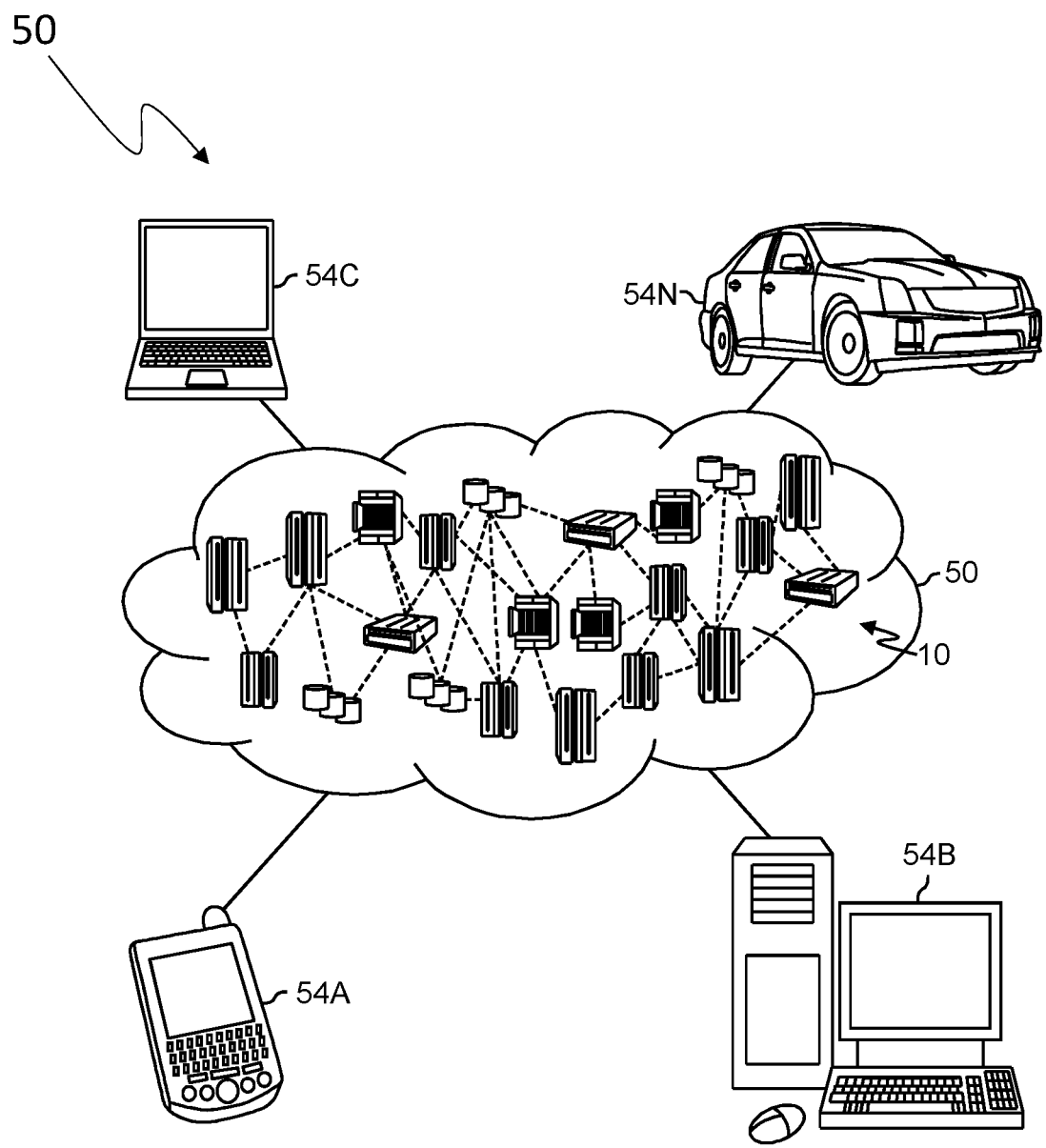
FIG. 2 depicts a cloud computing environment, according to an embodiment of the present invention.

Referring now to FIG. 2, cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N, may communicate. Nodes 10 may communicate with one another. They may be grouped (not shown) physically or virtually, in one or more networks, such as Private, Community, Public, or Hybrid clouds as described herein, or a combination thereof. This allows cloud computing environment 50 to offer infrastructure, platforms and/or software as services for which a cloud consumer does not need to maintain resources on a local computing device. It is understood that the types of computing devices 54A, 54B, 54C, and 54N shown in FIG. 2 are intended to be illustrative only and that computing nodes 10 and cloud computing environment 50 can communicate with any type of computerized device over any type of network and/or network addressable connection (e.g., using a web browser).

Figure 3:
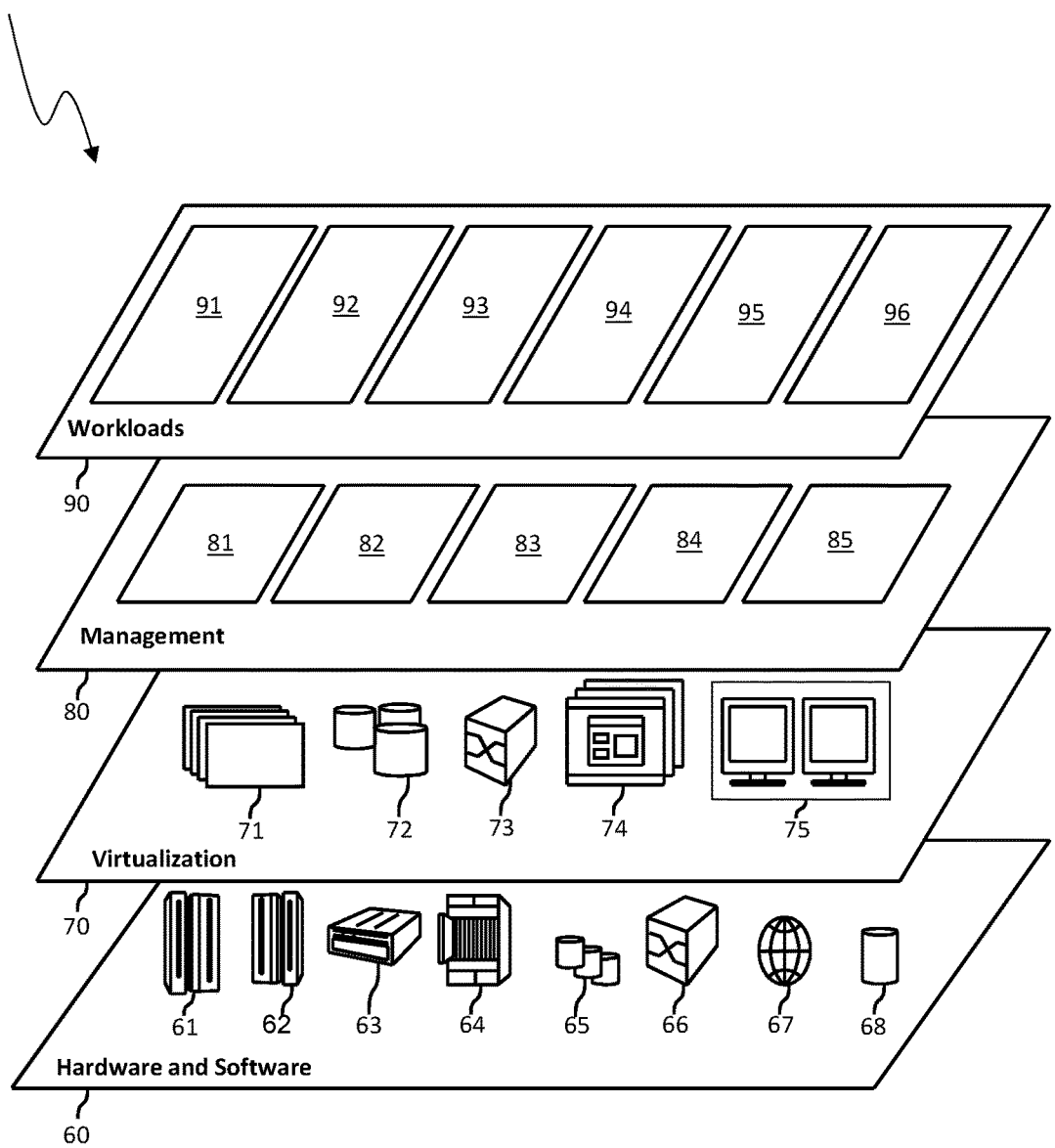
FIG. 3 depicts abstraction model layers, according to an embodiment of the present invention.

Referring now to FIG. 3, a set of functional abstraction layers 300 provided by cloud computing environment 50 (FIG. 2) is shown. It should be understood in advance that the components, layers, and functions depicted by abstraction layers 300 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and response strategy processing 96.

In the context of the present disclosure, a "service" can be a general term that can refer to any service capable of being executed or otherwise provisioned by a server in a computing environment to support a corresponding task or function. For example, a service can be any type of web service, such as an online shopping website, a news website, a ticket booking website, etc. As mentioned above, in a complex data processing system, there might be millions of requests for accessing services, and sometimes the number of requests may be widely variable due to expected or unexpected events. For example, in shopping season, the requests for accessing services of an online shopping website may suddenly increase. This will potentially overload the corresponding servers which process the services and may cause the services to be interrupted. Typically, for the expected events, existing solutions may increase the workload processing capacity of the servers by leveraging outside hardware, such as by adding routers and/or servers. However, this is only feasible for expected events and it would need the support of additional hardware. For unexpected events, such as in the scenario that significant news occurs which may cause server overload, or in the scenario that unexpected network performance degradation due to a disaster/outage occurring, the unexpected event will result in transaction failure as well. And it is difficult to meet the demand by adding hardware in advance in the scenarios of unexpected events. Moreover, by adding hardware such as servers, it is likely to cause a waste of resources. It is desired that there is a way to leverage existing resources to cope with expected and/or unexpected events, and at the same time ensure that the system works normally. Existing solutions, however, fail to provide such functionality.

Embodiments of the present invention provide such functionality by leveraging a new solution as described below.

Figure 4:
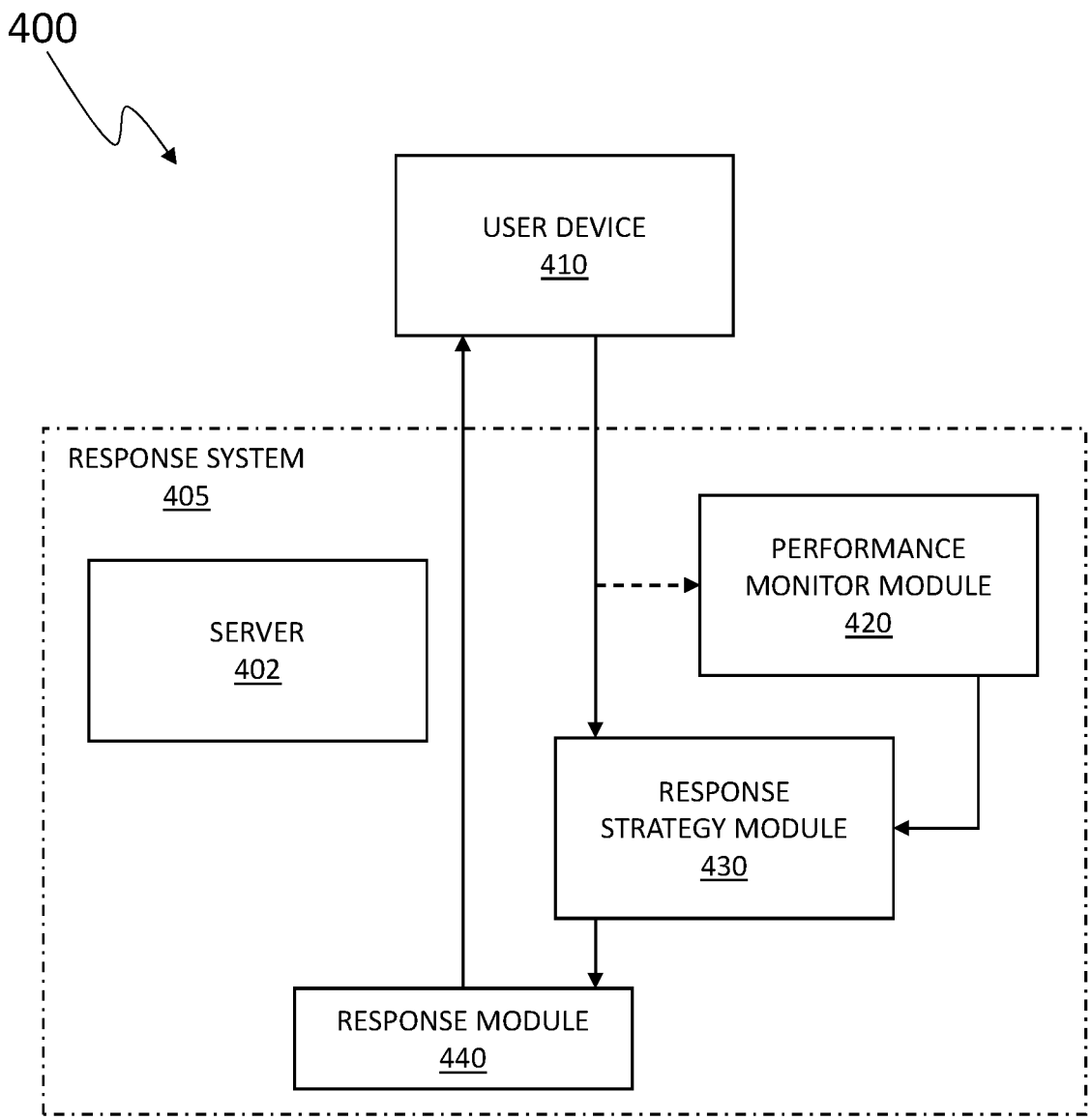
FIG. 4 depicts a block diagram of an exemplary system in which embodiments of the present invention can be implemented.

Reference is made to FIG. 4 which depicts a block diagram of computing environment 400 in which embodiments of the present invention can be implemented. Response system 405 and server 402 are included in computing environment 400. According to an embodiment of the present invention, user device 410 transmits a request for accessing a service provided by a server, such as server 402 in computing environment 400. It should be understood there might be more than one user device 410, although there is only one shown in FIG. 4. Server 402 may be any type of server, for example, servers that provide different types of web services, such as shopping, news, ticket booking, etc. The server may be in a complex computing environment (not shown in FIG. 1). Computing environment 400 may be any type of distributed computing environment implemented by a variety of computing nodes/devices. An example of the distributed computing environment may include a cloud computing environment, such as cloud computing environment 50 depicted in FIG. 2.

Response system 405 includes server 402, performance monitor module 420, response strategy module 430, and response module 440. Server 402 provides configuration services for performance module 420, response strategy module 430, and response module 440. In one embodiment, performance monitor module 420, response strategy module 430, and response module 440 are included in server 402. In another embodiment, performance monitor module 420, response strategy module 430, and response module 440 are found on other computing devices (not shown in FIG. 4). Performance monitor module 420 may monitor and evaluate the performance of server 402 dynamically or in any other way and provide a performance value of the sever. Response strategy module 430 is configured to determine the response strategy based on the current performance value of server 402 determined by performance monitor module 420. Response module 440 may respond to the transmitted request from user device 410 based on the response strategy determined by response strategy module 430 to fulfill the service of server 402. FIG. 4 is merely a simplified illustration and it should be understood to not comprise all possible appropriate configurations.

For purposes of discussion, the embodiments of the present invention will be described in detail with further reference to FIG. 4 and FIG. 5 below.

Figure 5:
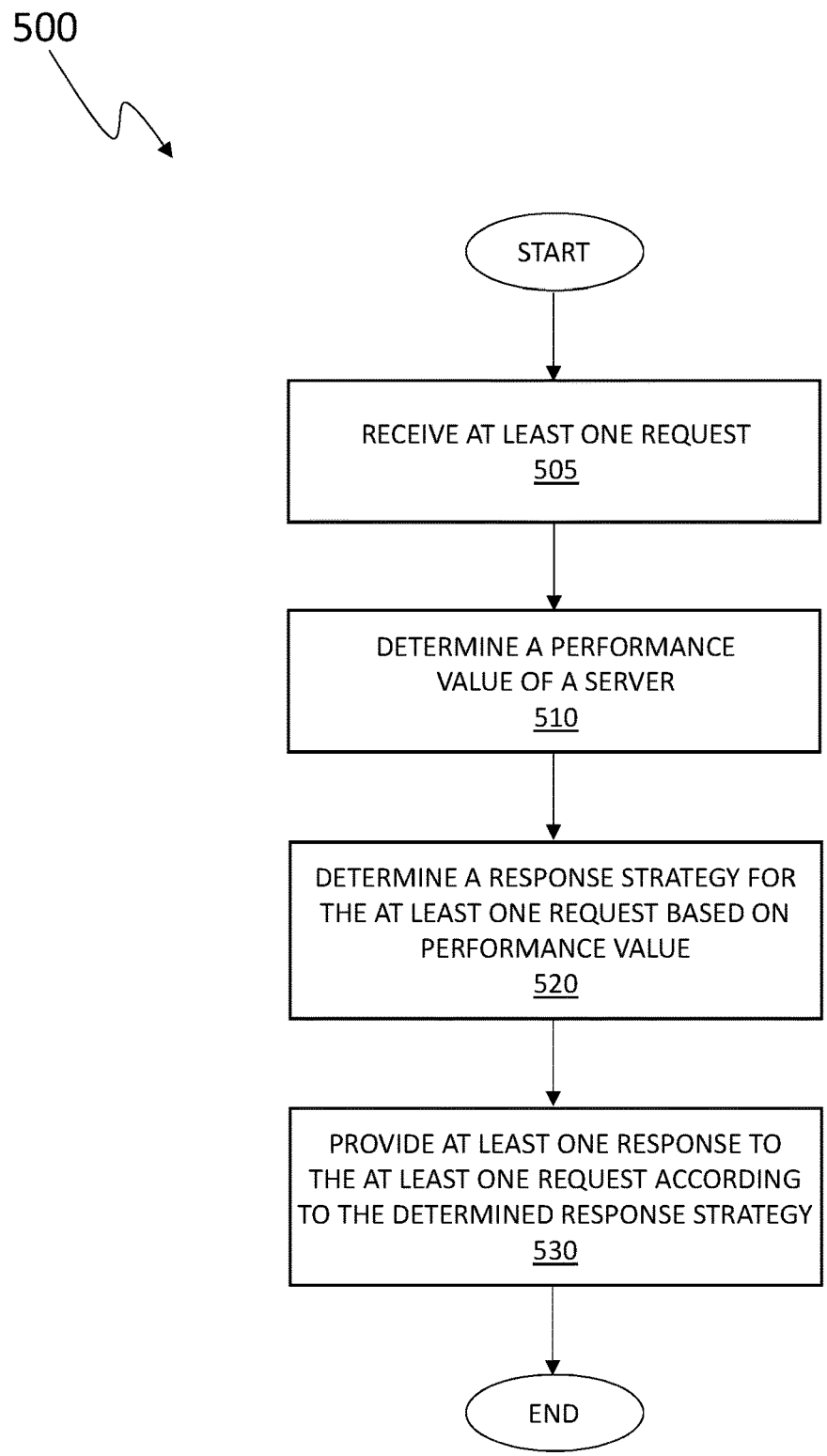
FIG. 5 depicts a flowchart of an exemplary method for data processing based on a response strategy, according to an embodiment of the present invention.

With reference to FIG. 5, flowchart 500 of an example method for data processing based on a response strategy according to an embodiment of the present invention is depicted. The method starts at step 505 and continues through step 530.

At step 505, at least one request is transmitted by at least one user and the at least one request is received by the server.

At step 510, in response to at least one request to the sever being received, a performance value of the server is determined, for example, by performance monitor module 420 shown in FIG. 4. The at least one request from user(s) is intended to access a service processed by a server such as server 402.

In an embodiment, a performance value may represent the performance of the server. Those skilled in the art may understand that the performance variables of the server may include, but are not limited to, operation processing capacity, disk storage, system availability, manageability and scalability, etc. The main factors affecting the performance of a server may include service workload (i.e., the number of requests from end-users), a network bandwidth, etc. Sometimes the service workload may increase suddenly due to an expected event (such as shopping season, festivals, etc.) and/or an unexpected event (such as significant news). Network performance may degrade due to a natural disaster or a service outage. The occurrence of the above situations could cause service to be interrupted and to stop responding to new requests. Alternatively, server resources may be underutilized if the requests for accessing the service are below normal levels.

According to an embodiment of the present invention, the performance value may be determined based on at least one of the following: a responding time to a request, a network bandwidth, a percentage of memory usage, a central processing unit (CPU) occupancy, an upload/download data rate, etc. The performance value of the server may be determined by performance monitor module 420 in FIG. 4 with existing tools. There are many such existing tools known in the art. The evaluation of the performance of the server may utilize any other appropriate approaches currently existing or developed in the future and should not adversely limit the scope of the invention.

In certain embodiments, the performance value may be a numerical value. In one embodiment, the performance value and the server performance may be proportional; i.e., the higher the performance value, the better the server performance. In another embodiment, the performance value and the server performance may be inversely proportional; i.e., the lower the performance value, the better the server performance. In the embodiments hereafter, the performance value and the server performance are proportional, but it should be understood that the relationship between the performance value and the server performance could have other relationships. According to an embodiment of the invention, the performance value of the server may be divided into different levels, such as "High", "Medium", and "Low" to approximate the corresponding levels of performance of the server. Classifying the performance value or a range of the performance values of the server as "Medium" occurs when the server works properly (i.e., "Medium" performance is considered as nominal performance when measured against the specified capabilities of the server). The performance value higher than "Medium" or the highest value in the "Medium" range may be classified as "High" (i.e., a performance that exceeds, in a statistically significant manner, the nominal performance of the specified capabilities of the server) and the performance value lower than "Medium" or the lowest value in the "Medium" range may be classified as "Low" (i.e., a performance worse than, in a statistically significant manner, the nominal performance of the specified capabilities of the server). Consider the following example. A server that is connected to a one gigabit per second Internet bandwidth port will have a maximum transmission rate of one-hundred twenty-five megabits of data per second (Mbps). This rate is considered as "High" performance and is achieved under a set of optimal conditions. When the set of conditions become something less than optimal, but the server is still operating properly, the transmission rate may drop (e.g., drop from one-hundred twenty-five Mbps to seventy-five Mbps). This may be considered as "Medium" (or nominal) performance. Further degradation in the set of conditions will affect the transmission rate even more (e.g., drop from seventy-five Mbps to thirty Mbps). This may be considered as "Low" performance by the server. These levels of the performance values can be defined based on practical needs. For purpose of simplicity, the three levels of the performance value above are defined and shown in Table 1 below for illustration, which suggests no limitation to the present disclosure. Embodiments of the present invention can be applied to more levels, or less levels, with the same, similar, or totally different definitions.

TABLE 1

| Level of the Performance Value | High | Medium | Low |
| --- | --- | --- | --- |

At step 520 in FIG. 5, a response strategy for the at least one request transmitted to the server for accessing the service provided by the server is determined based on the performance value of the server as determined by, for example, response strategy module 430 in FIG. 4.

According to an embodiment of the invention, step 520 may further comprise determining a response scale corresponding to the performance value. In one embodiment, data transmission volumes in the responses are different for different response scales. A mapping between the response scale and the level of the performance value of the server may be predefined. In some embodiments in the mapping, the higher the level of the performance value, the larger the transmission data volume for the response scale. The mapping between the response scale and the level of the performance value of the server can be defined based on practical needs. In some embodiments, for purpose of simplicity, the response scale is represented by the data transmission volume of a corresponding size (such as "Large", "Medium", and "Small") in the response herein. Three response scales corresponding to the three levels of the performance values are shown below in Table 2 for illustration, which suggests no limitation to the present disclosure. Embodiments of the present disclosure can be applied to more response scales, or less response scales, with the same, similar, or totally different definitions.

TABLE 2

| | The Level of the Performance Value | | |
| --- | --- | --- | --- |
| | High | Medium | Low |
| The Response Scale | Large data transmission volume | Medium data transmission volume | Small data transmission volume |

The details of different performance value levels will be further described below with reference to FIG. 6 which depicts flowchart 600.

According to another embodiment of the invention, step 520 in FIG. 5 may comprise identifying the identical requests from the at least one request transmitted to the server in response to the determined performance value being below a threshold. The threshold could be pre-defined, for example, based on the experience of a user or based on practical needs. This will be further described below with reference to FIG. 7.

At step 530 in FIG. 5, at least one response is provided to the at least one request transmitted to the server according to the determined response strategy by, for example, response module 440 in FIG. 4. In this step, the request received by the server can be processed and satisfied, and the service is completed.

According to an embodiment of the invention, step 530 in FIG. 5 may comprise providing at least one response to the at least one request according to the determined response scale corresponding to the performance value, which will be further described below with reference to FIG. 6.

According to another embodiment of the invention, step 530 in FIG. 5 may comprise generating a response for one of the identical requests received by the server and distributing the response to each of the identical requests, which will be further described below with reference to FIG. 7.

Figure 6:
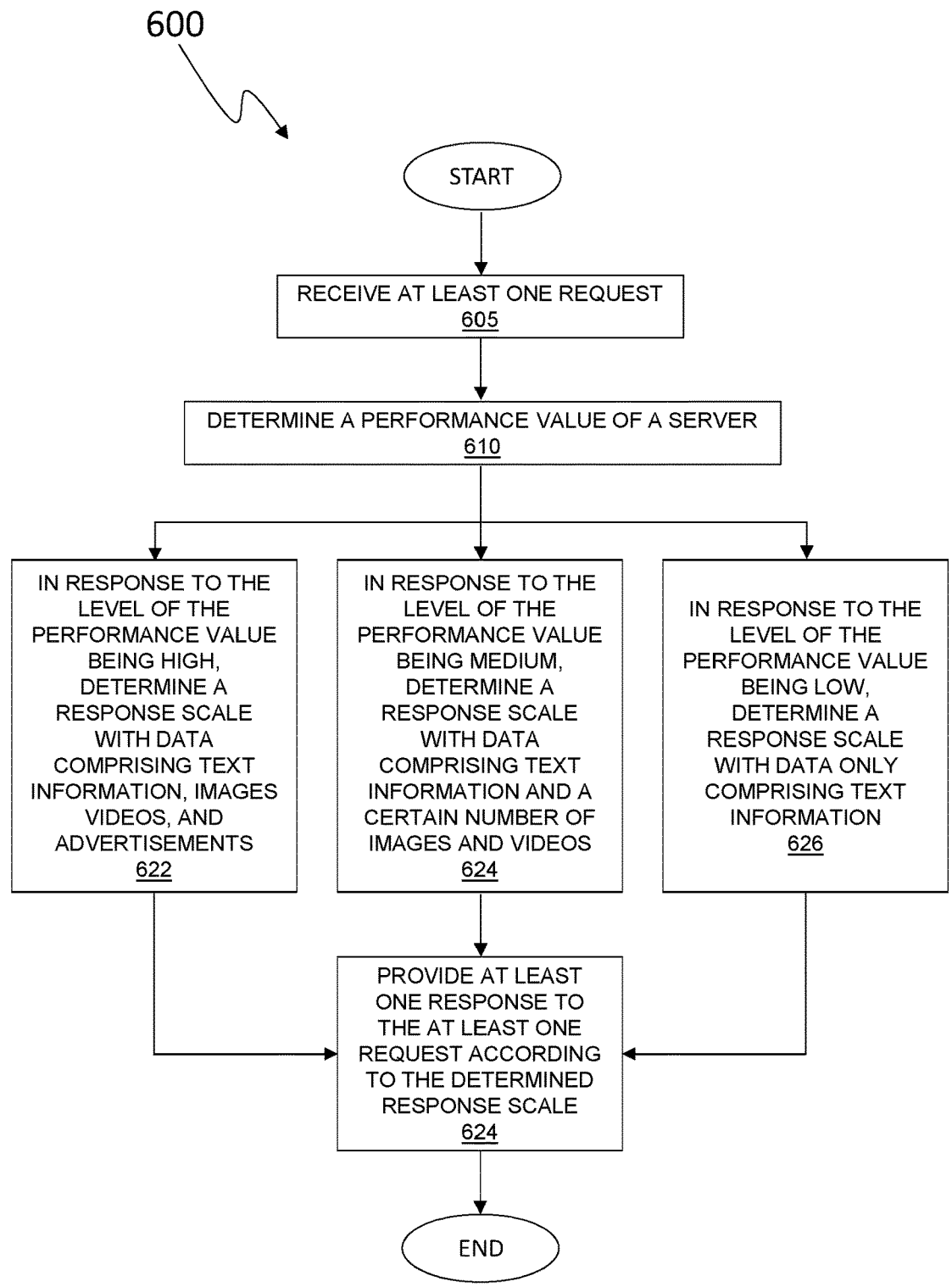
FIG. 6 depicts a flowchart of another exemplary method for data processing based on a response strategy, according to an embodiment of the present invention.
Figure 7:
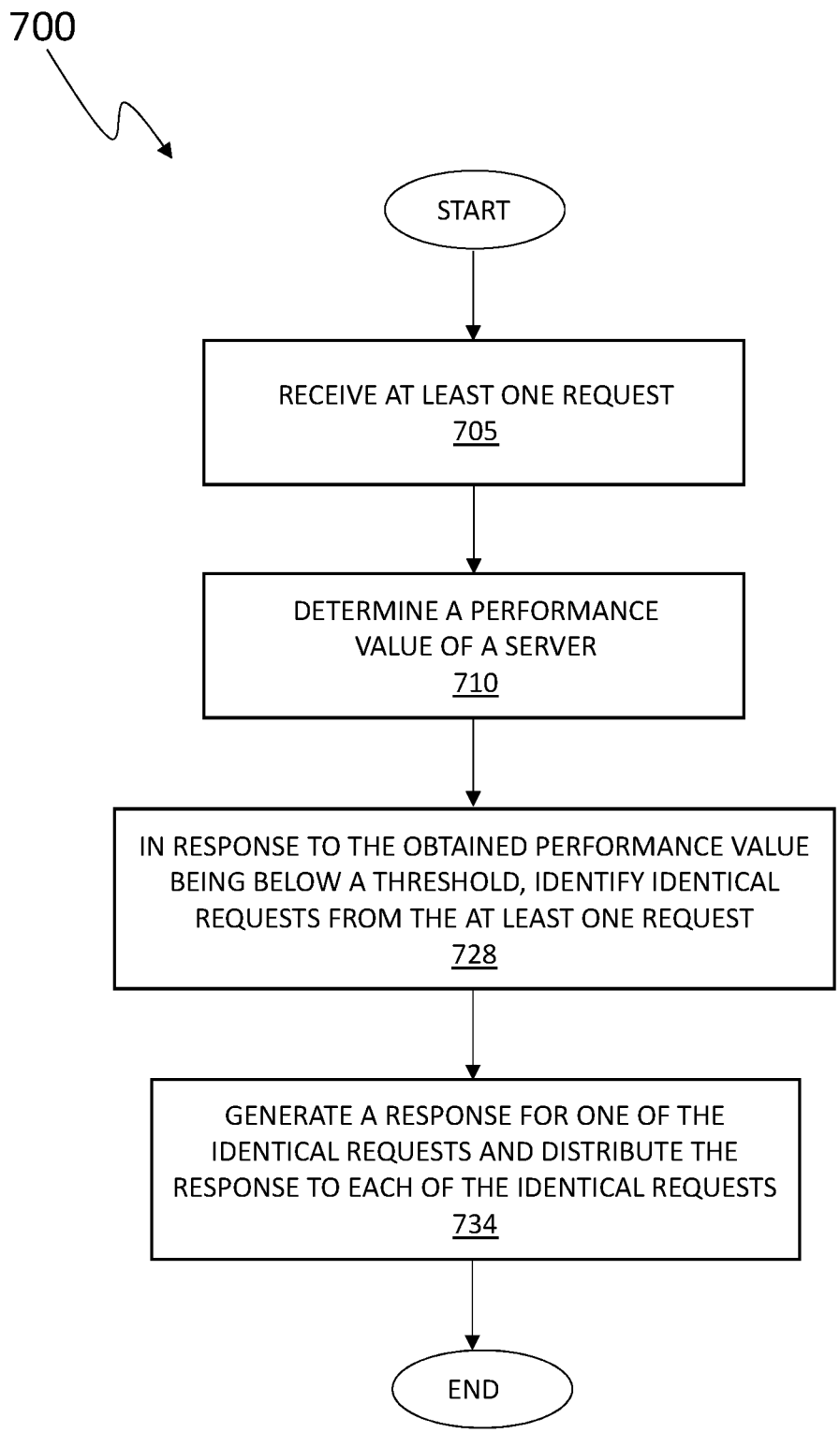
FIG. 7 depicts a flowchart of yet another exemplary method for data processing based on a response strategy, according to an embodiment of the present invention.
Figure 8:
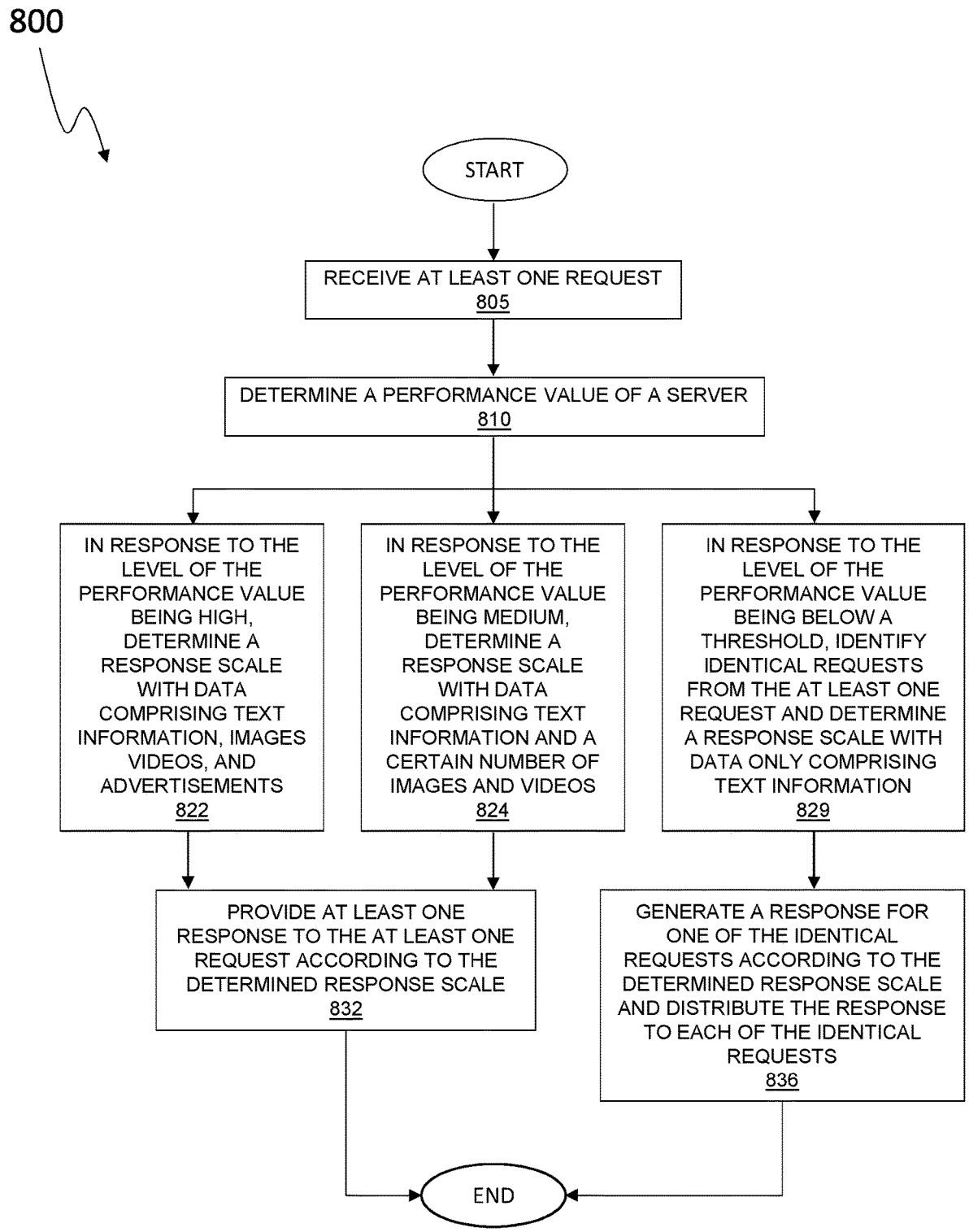
FIG. 8 depicts a flowchart of still another exemplary method for data processing based on a response strategy, according to an embodiment of the present invention.

FIGS. 6, 7 and 8 depict three flowcharts of exemplary methods for data processing based on a response strategy, according to embodiments of the present invention. The flowchart of an exemplary method is shown in FIG. 5. It should be pointed out that steps 605 and 610 in FIG. 6, steps 705 and 710 in FIG. 7 (which depicts flowchart 700), and steps 805 and 810 in FIG. 8 (which depicts flowchart 800) are the same as steps 505 and 510 in FIG. 5 and will not be described in detail herein for simplicity. Steps 622, 624, and 626 in FIG. 6, step 728 in FIG. 7, and step 829 in FIG. 8, are further details of step 520 in FIG. 5 and step 632 in FIG. 6, step 734 in FIG. 7, and step 836 in FIG. 7 are further details of step 530 in FIG. 5, which will be discussed in detail below.

Referring to FIG. 6, after at least one request is received by the server in step 605 and the current performance value of the server is determined at step 610, a level of the performance value of the server is determined and then a response scale represented by the data transmission volume of the corresponding size is matched to the level of the performance values of the server. Those skilled in the art will appreciate that the size of data transmission volume depends mainly on the type of data itself as well as the amount of data to be transferred. For example, data in the form of a text file normally contains less data transmission volume than data in the form of images or video files. Certainly, for the same type of file, the fewer files transferred, the less data there is to be transferred.

The types of data and the amount of data in the response may be determined based on practical needs. The types of data and the amount of data in the response corresponding to each response scale are shown below Table 3 for illustration, which suggests no limitation to the present disclosure. Embodiments of the present disclosure can be applied to more or less types of data and/or amounts of data with the same, similar, or totally different definitions.

TABLE 3

| | The Level of the Performance Value | | |
| --- | --- | --- | --- |
| | High | Medium | Low |
| Response Scale | Large data transmission volume | Medium data transmission volume | Small data transmission volume |
| Types of Data and/ or the Amount of Data in the Response | All full text and sub-text information, including images, videos, and additional advertisement, etc. | Key text information or top n (e.g. 10) text information and sub-text information, including images and videos | Key text information, or text result information of top n (e.g. 10) ranked by relevance degree |

In FIG. 6, in response to the level of the performance value being low, the response scale of low data transmission volume will be determined as shown in step 626. For example, if the response scale of low data transmission volume is determined, the data included in the response may be "Key text information, or text result information of a top "n" items (e.g., ten) ranked by relevance". Similarly, in response to the level of the performance value of the server being medium, the response scale of medium data transmission volume will be determined as shown in step 624. For example, if the response scale of medium data transmission volume is determined, the data included in the response may be "Key text information or a top "n" items (e.g., ten) text information and sub-text information including images and videos". In response to the level of the performance value of the server being high, the response scale of large data transmission volume will be determined as shown in step 622. For example, if the response scale of high data transmission volume is determined, the data included in the response may be all full text and sub-text information associated with the "at least one request" received by the server for the service that will be provided by the server, including images, videos, etc. In some embodiments, in addition to the response to the request, some additional information such as advertisements, may be further included in the response to take advantage of the under-utilized server resources.

In the embodiment shown in FIG. 6, by way of controlling or adjusting the data transmission volume in the response, the server may adapt to the current performance status of the server in a compromised way. In the case of high performance of the sever, more image and/or video files are transmitted for better user experience. In the case of low performance of the sever, less data is transmitted. Under this condition, although the quality of the responses may be reduced, (e.g., only text files are included in the response), the basic requirements from users may be satisfied without causing server outages or downtime. As such, it is possible to achieve a basic service and serve more users without extra hardware burdens.

Referring now to FIG. 7, at step 728, in response to the performance value being below a threshold, the identical requests from the plurality of requests transmitted to the server may be identified. The threshold may be set as the performance value of "Medium" level as shown in Table 1 or may be defined based on practical needs. For these identical requests, in Step 734, the server only processes one of the identical requests, so only one response is generated and the generated response is distributed to each of the identical requests in the plurality of requests. For example, consider that there are one hundred users who request access to a significant news item. Under this situation, the one hundred requests may be identified as identical requests and only one request is processed instead of one hundred requests. Then the same response is distributed to the one hundred users.

In this way, repeated processing for the multiple identical requests may be avoided. The server resources can be saved, and the performance of the service will be optimized. The more complex the logic of processing of the requests within the server, and/or the more the identical requests are, the more resources may be saved.

It should be understood that the exemplary methods in FIG. 6 and FIG. 7 may be executed separately and may also be combined as one exemplary method which is described below in the discussion of FIG. 8.

Referring to FIG. 8, the steps 822, 824, and 832 in FIG. 8 are the same as steps 622, 624, and 632 in FIG. 6, which will not be described in detail herein. In this embodiment shown in FIG. 8, in response to a level of performance value of the server being low, not only the identical requests from the requests are identified, but also the response scale with data only comprising text information is determined as shown in step 829. In step 836 as shown in FIG. 8, a response for one of the identical requests is generated according to the determined response scale and the response is distributed to each of the identical requests. It can be understood that the step 829 as shown in FIG. 8 is the combination of the step 626 as shown in FIG. 6 and the step 728 as shown in FIG. 7. Similarly, the step 836 as shown in FIG. 8 is the combination of the step 632 as shown in FIG. 6 and the step 734 as shown in FIG. 7. By the combination, enhanced server resource savings may be achieved.

According to embodiments of the invention, the information regarding the response scale may be embedded into the response. For example, a note stating "only text result information of a top "n" items (e.g., ten) ranked by relevance is included due to current poor performance of server" may be delivered together with the response. This way, the users can understand the current status of service and have a better experience.

It should be noted that the processing of the response strategy according to embodiments of this disclosure could be implemented by computer system/server 12 of FIG. 1.

The present invention may be a computer system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   determining, by one or more processors, a performance value of a server in response to receiving at least one request to the server;
   determining, by one or more processors, a response scale proportional to the determined performance value, wherein the higher the determined performance value, the larger a transmission data volume for the response scale;
   determining, by one or more processors, a response strategy for the at least one request, wherein the response scales transmission volume according to high, medium, and low volumes and ranks portions of data that are transmitted based on the determined performance value, the determined response scale, and relevance of the ranked portions of data;
   embedding text that includes rationale for selecting the determined response scale into at least one response, wherein the text describing a limited number of items that are ranked by relevance along with an explanation for the limited number of items;
   dynamically modifying, by one or more processors, the portions of data, media associated with the portions of data, and textual information associated with the portions of data that are transmitted according to the determined response scale that corresponds to the determined performance value; and
   dynamically providing, by one or more processors, the at least one response to the at least one request according to the determined response strategy.

2. The method of claim 1, wherein the step of determining, by one or more processors, a response scale corresponding to the determined performance value further comprises:
   determining, by one or more processors, a level of the performance value; and
   in response to the level of the determined performance value being low, determining, by one or more processors, a response scale with low data volume only comprising text information.

3. The method of claim 1, wherein the step of determining, by one or more processors, a response scale corresponding to the determined performance value further comprises:
   determining, by one or more processors, a level of the performance value; and
   in response to the level of the determined performance value being medium, determining, by one or more processors, a response scale with data comprising text information and a certain number of images and videos.

4. The method of claim 1, wherein the step of determining, by one or more processors, a response scale corresponding to the determined performance value further comprises:
   determining, by one or more processors, a level of the performance value; and
   in response to the level of the determined performance value being high, determining, by one or more processors, a response scale with data comprising text information, images, videos, and advertisements.

5. The method of claim 1, further comprising: embedding, by one or more processors, information regarding the determined response scale into the at least one response, wherein the embedded information is comprised of data associated with a current performance of the server.

6. The method of claim 1, wherein the step of determining, by one or more processors, a response strategy for the at least one request based on the determined performance value, comprises:
in response to the determined performance value being below a threshold, identifying, by one or more processors, identical requests from the at least one request; and
wherein the step of providing, by one or more processors, at least one response to the at least one request according to the determined response strategy, comprises:
generating, by one or more processors, a response for one of the identical requests; and
distributing, by one or more processors, the response to each of the identical requests.

7. The method of claim 1, wherein the performance value is determined based on at least one of the following:
a response time to a request, a network bandwidth, a percentage of memory usage, a central processing unit occupancy, and an upload/download data rate.

8. The method of claim 1, further comprising:
ensuring functionality based on current performance status, by one or more processors, by adjusting data transmission volume in the response to achieve basic service levels and service more users without causing server outages or downtime.

9. The method of claim 8, further comprising:
reducing quality of responses to satisfy basic requirements of respective users to achieve basic service levels.

10. The method of claim 1, further comprising:
in response to receiving a plurality of requests, identifying, by one or more processors, identical requests of the plurality of requests based on workload types;
optimizing, by one or more processors, a performance response by generating a singular response;
distributing, by one or more processors, the generated singular response to each of the identical requests in the plurality of requests; and
ignoring, by one or more processors, other identical requests of the plurality of identical requests.

11. A computer system, comprising:
one or more processors;
a memory coupled to at least one of the one or more processors; and
a set of computer program instructions stored in the memory and executed by at least one of the one or more processors to perform a method comprising:
determining, by one or more processors, a performance value of a server in response to receiving at least one request to the server;
determining, by one or more processors, a response scale proportional to the determined performance value, wherein the higher the determined performance value, the larger a transmission data volume for the response scale;
determining, by one or more processors, a response strategy for the at least one request, wherein the response scales transmission volume according to high, medium, and low volumes and ranks portions of data that are transmitted based on the determined performance value, the determined response scale, and relevance of the ranked portions of data;
embedding text that includes rationale for selecting the determined response scale into at least one response, wherein the text describing a limited number of items that are ranked by relevance along with an explanation for the limited number of items;
dynamically modifying, by one or more processors, the portions of data, media associated with the portions of data, and textual information associated with the portions of data that are transmitted according to the determined response scale that corresponds to the determined performance value; and
dynamically providing, by one or more processors, the at least one response to the at least one request according to the determined response strategy.

12. The computer system of claim 11, wherein the step of determining, by one or more processors, the response scale corresponding to the performance value further comprises:
determining, by one or more processors, a level of the performance value; and
in response to the level of the determined performance value being low, determining, by one or more processors, a response scale with low data volume only comprising text information.

13. The computer system of claim 11, wherein the step of determining, by one or more processors, the response scale corresponding to the performance value further comprises:
determining, by one or more processors, a level of the performance value; and
in response to the level of the determined performance value being medium, determining, by one or more processors, a response scale with data comprising text information and a certain number of images and videos.

14. The computer system of claim 11, wherein the step of determining, by one or more processors, a response scale corresponding to the determined performance value further comprises:
determining, by one or more processors, a level of the performance value; and
in response to the level of the determined performance value being high, determining, by one or more processors, a response scale with data comprising text information, images, videos, and advertisements.

15. The computer system of claim 11, further comprising: embedding, by one or more processors, information regarding the determined response scale into the at least one response, wherein the embedded information is comprised of data associated with a current performance of the server.

16. The computer system of claim 11, wherein the step of determining, by one or more processors, the response strategy for the at least one request based on the determined performance value, comprises:
in response to the determined performance value being below a threshold, identifying, by one or more processors, identical requests from the at least one request; and
wherein the step of providing, by one or more processors, at least one response to the at least one request according to the determined response strategy, comprises:
generating, by one or more processors, a response for one of the identical requests; and
distributing, by one or more processors, the response to each of the identical requests.

17. A computer program product, comprising a non-transitory computer readable storage medium having program instructions embodied therewith, the program instructions being executable by a computer to cause the computer to perform a method comprising:

determining, by one or more processors, a performance value of a server in response to receiving at least one request to the server;

determining, by one or more processors, a response scale proportional to the determined performance value, wherein the higher the determined performance value, the larger a transmission data volume for the response scale;

determining, by one or more processors, a response strategy for the at least one request, wherein the response scales transmission volume according to high, medium, and low volumes and ranks portions of data that are transmitted based on the determined performance value, the determined response scale, and relevance of the ranked portions of data;

embedding text that includes rationale for selecting the determined response scale into at least one response, wherein the text describing a limited number of items that are ranked by relevance along with an explanation for the limited number of items;

dynamically modifying, by one or more processors, the portions of data, media associated with the portions of data, and textual information associated with the portions of data that are transmitted according to the determined response scale that corresponds to the determined performance value; and dynamically providing, by one or more processors, the at least one response to the at least one request according to the determined response strategy.

18. The computer program product of claim 17, wherein the step of determining, by one or more processors, the response scale corresponding to the performance value further comprises:

determining, by one or more processors, a level of the performance value; and in response to the level of the determined performance value being low, determining, by one or more processors, a response scale with low data volume only comprising text information.

19. The computer program product of claim 17, wherein the step of determining, by one or more processors, the response scale corresponding to the performance value further comprises:

determining, by one or more processors, a level of the performance value; and in response to the level of the determined performance value being high, determining, by one or more processors, a response scale with data comprising text information, images, videos, and advertisements.

* * * * *